Oct. 29, 1940.  E. WIEMER  2,219,435

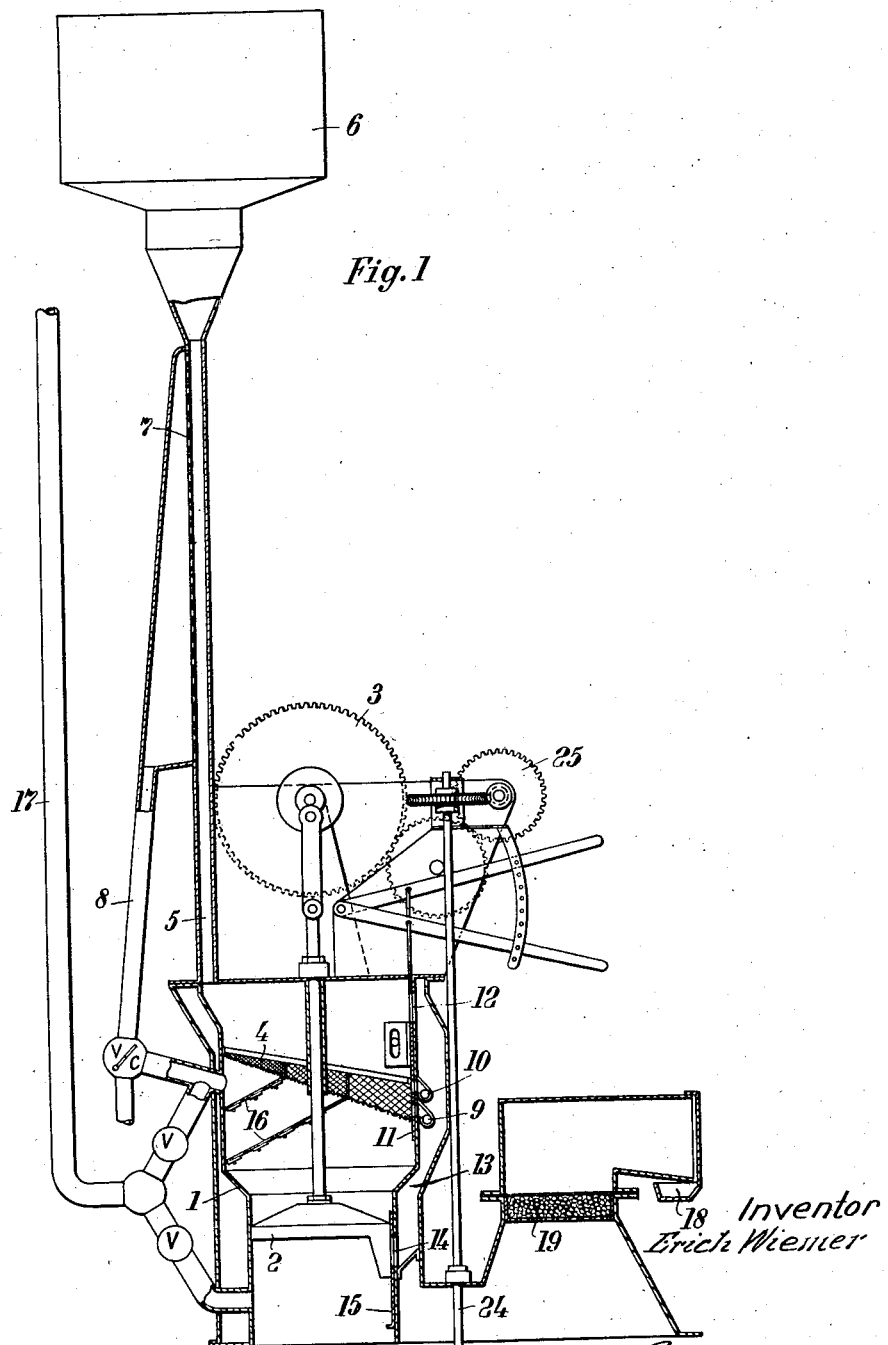

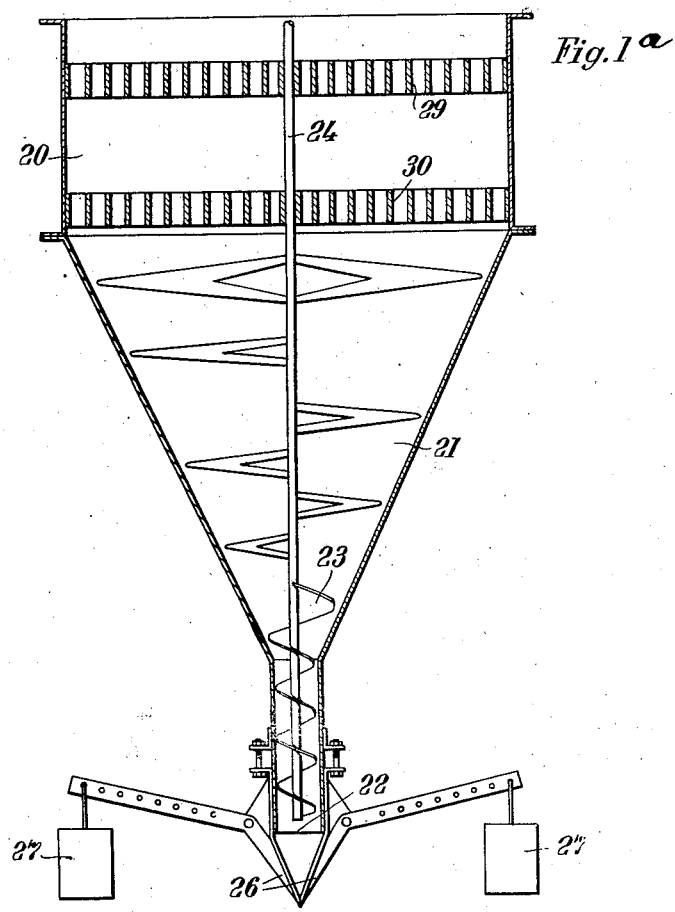

PROCESS AND DEVICE FOR TREATING MUDS

Filed Aug. 23, 1938  3 Sheets-Sheet 3

Inventor
Erich Wiemer
By
Attorney

Patented Oct. 29, 1940

2,219,435

UNITED STATES PATENT OFFICE 2,219,435

PROCESS AND DEVICE FOR TREATING MUDS

Erich Wiemer, Saarbrucken, Germany

Application August 23, 1938, Serial No. 226,396
In Germany August 28, 1937

9 Claims. (Cl. 201—457)

This invention relates to a process and device for treating muds.

Preparation by the wet process unavoidably involves the formation of muds. As these muds contain many good constituents which can be used again, extensive devices, such as settling tanks and ponds, clarifying cisterns and flotation and filtration plants of various designs, have been developed for removing utilizable water from the muds, sorting the latter during preparation or rendering them fit for use by filtering. The cost of production and upkeep of such devices is of course high. Other objections are that the parts of a plant are separated in space, that flotations consume much power and oil and filtration is expensive on account of the enormous wear of coverings. Generally speaking, the results produced by the known devices are out of proportion to expenditures. Furthermore, the devices mentioned perform only a single operation.

It is the object of the invention to provide a process and device for preparing, clarifying and filtering muds in one sequence of operation, so that for instance coal muds are separated into rocky particles, pyrites, combined pieces of coal and shale, pure coal mud having a low water content and utilizable water. The process consists in imparting an upward motion to water in a closed space and under pressure by means of a piston of the type used in settling classifiers and forcing it through the settling bottom over which the mud moves. Owing to the upward motion imparted to it the mud settles according to the specific gravity of its constituents which are thus separated and can be drawn off. Simultaneously, the wash water when flowing off is subjected to fluctuations in pressure and driven by filter means into an outlet while its solid constituents settle out and are discharged with little water. The process according to the invention makes it possible to perform the three steps mentioned in a single pass of operation, though it may be applied so as to cover only one step. The device for carrying out the process may be constructed so that the space under the outlet of the pure water filter comprises one or more settling chambers each of which is shut off by a closure means which after a corresponding settling time periodically opens the chamber to expose it to the action of a piston.

The device according to the invention comprises a casing containing a reciprocating piston, a filter and a conical settling tank placed under the casing and piston. At the lower end of the tank a conveying means, as a worm, is provided. The space of the casing above the piston is closed and divided by a settling bed, and the space above the bed is in communication with the mud feed. In the wall of the casing discharge grooves and overflows are provided on a level with or above the settling bed.

As only slight masses have to be moved, power consumption is very low compared with prevailing methods while the throughput is considerably greater.

The device serves not only for preparing, clarifying and filtering the wash water resulting from coal washing but also for clarifying and filtering flotation muds from which pyrite or other constituents may be extracted if required. The device can further be advantageously used in the chemical industries, the clay industry, in ore-smelting, in beet sugar production, etc.

The invention is illustrated by way of example in the accompanying drawings, in which:

Fig. 1 is a longitudinal section of the upper portion of the apparatus;

Fig. 1ª is a similar view of the lower portion of the apparatus;

Figure 2:
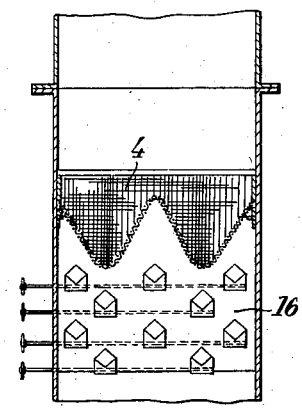
Fig. 2 is a detail section on the line 2—2 of Fig. 5.
Figure 3:
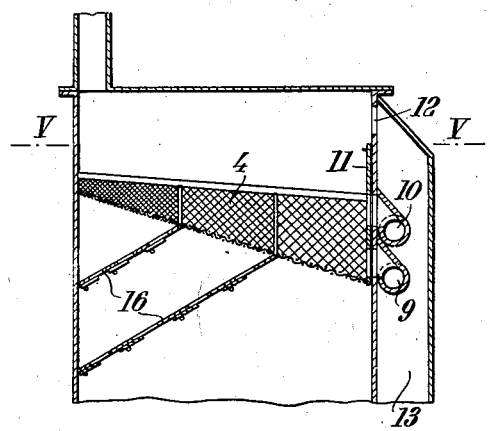
Fig. 3 is a detail section on the line 3—3 of Fig. 5.
Figure 4:
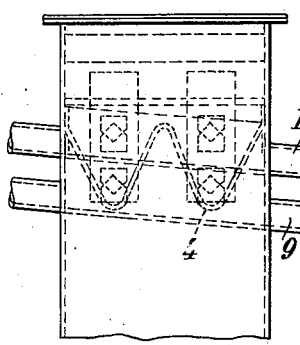
Fig. 4 is an elevation of the casing housing the settling bed or screen shown in Figs. 2 and 3.
Figure 5:
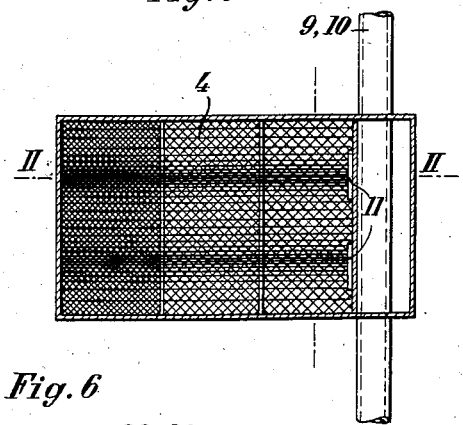
Fig. 5 is a detail section on the line 5—5 of Fig. 3.
Figure 6:
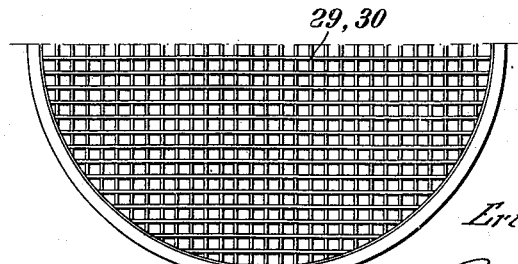
Fig. 6 is a detail plan view of a portion of one of the grates in the quieting cylinder.

In the casing 1 the piston 2, driven by a crank operated by a gear 3, moves up and down. The portion of the casing 1 located above the piston 2 is divided into two parts by the settling bed 4. The upper space communicates through the channel 5 with the charging receptacle 6. The muds, washing water, etc., are fed through the channel 5 a portion of which at 7 serves as filter so that already at the feeding of the mud preparatory screening is effected and the liberated water can pass through the conduit 8 for further use as will be described below. The settling bed 4 is inclined and possesses at its lower portion several superposed discharging means 9 and 10 for discharging the classified muds. The inlet openings of the members 9, 10 can be closed by the slides 11. The mud freed from heavier particles passes through an overflow 12 into the channel 13 which connects the space above the settling bed 4 with the space below the piston 2.

The connecting opening 14 is controlled by a slide 15 and the piston 2. Between the piston 2 and the settling bed 4 are division plates 16 provided with openings controlled by adjustable slides or valves to uniformly distribute the liquid over the bed 4 as required. Through a conduit 17 additional fresh water is fed to the space between the piston 2 and the bed 4. For this purpose the water separated already on the feed path and passed through the conduit 8 may be used. The settling bed 4 may be of any suitable construction.

Near the casing 1 a water outflow connection 18 is disposed and provided with the filtering medium 19 below which the settling space 20 is arranged whose lower portion 21 tapers and terminates in an outlet 22. In the center of the container 21 a worm 23 is positioned which receives its drive by means of the shaft 24 and the intermediate elements 25 from the main drive of the machine or is operated by a separate drive. At the end of the outlet 22 flaps 26 are loaded by the weight 27. Owing to the action of the weights 27 the ends of the flaps 26 shut off the opening of the container 21. The load or leverage can be varied to change the pressure at which the flaps are closed.

The device functions as follows:

The wash water obtained for instance in coal cleaning is fed from the elevated receptacle 6 to the settling bed 4 where it is prepared. Separation into pure coal muds, tails and pyrite is effected in known manner by the up and down motion of the piston 2. Preferably, only the upward motion of the piston 2 is utilized to force a stream of liquid through the settling bed 4 from below. As the downward stroke involves the risk of drawing finely granular matter down through the bed, fresh water is supplied to the space below the bed 4 through the conduits 17 or 8 to prevent it. If, however, greater speeds are concerned and the filter 7 at the simple passage of water lacks sufficient efficiency, the conduit 8 of the filter 7 is connected with the space between the piston 2 and the settling bed 4, so that owing to the up and down motion of the piston 2 the filter 7 is subjected to suction and pressure through the medium of the conduit 8. The supply conduit 8 is fitted with a regulating valve which has a throttling effect upon the water flowing in the direction of the screen or filter 7. During the downward motion of the piston 2 water is drawn through the filter 7 while the valve is fully opened and flows into the space under the bed 4. At the upstroke of the piston 2, owing to automatic throttling of the valve opening, a partial stream of the drawn in water is forced through the filter 7 to clean it. In this way, a considerable amount of water is drawn off already by the screen 7.

By the upstroke of the piston 2 the remaining greater portion of water is forced through the porous settling bed 4 into the space above the settling bed 4. When the piston 2 is in lowest position the mud water above the bed 4 is at rest, since the feed opening 14 is closed by the piston. During the upward motion of the piston 2 from its lowest position until the opening 14 is exposed the water above the bed 4 moves up in the direction of the charging receptacle 6 which is always filled with mud water. In the course of further upward motion of the piston 2 the water above the bed 4, from the exposed supply opening 14 to the highest position of the piston, moves up towards the overflow 12 and deposits the heavier tails contained in the mud, the process being similar to the one applied in the operation of jigs. The water running off over the overflow 12 is thus freed from coarse particles and contains only coal mud. The particles that have settled in the course of the process described are drawn off from the bed space by the correspondingly adjusted discharging means 9, 10 which are not connected with the channel 13, so that mud or wash water cannot enter the latter through them. The discharging means 9 serves for removing pyrite and the discharge 10 for eliminating tails.

The pure coal muds pass with the water over the partition 12 into the by-pass 13 and thence through the outlet opening 14 controlled by the piston 2 into the pulp thickener 20, 21 where most of the constituents of the mud drop down.

Furthermore, during its descent the piston 2 presses the water against the filtering medium 19 so that clear water can pass out through the connection 18 and the mud portions drop off below the medium 19.

The settling and pressure piston 2 has therefore several functions to fulfil. During the upstroke it causes the removal of mud particles from the filtering medium 19 against which they have been pressed, the settling of the slime above the piston in the settling bed 4, the drawing of the wash water from the by-pass 13 into the thickener 20 and the cleaning of the preliminary filter 7 by a partial stream.

During the descent of the piston the opening 14 admitting mud water from the charging channel 13 is closed, the water to be filtered is pressed through the filtering medium 19 and the preliminarily filtered additional water is drawn in.

The water that has passed through the filtering medium 19 and entered the connection 18 is used again at the points of consumption.

The quieting cylinder 20 contains two grates 29, 30.

The coal muds deposited at the bottom of the thickener are discharged by means of the worm 23 and regulated or pressed by the control flaps 26 and their associated counter-weights provided at the outlet 22. The mud to be discharged by the worm 23 is forced through the flaps 26, and the squeezed-out water returns via the worm to the thickener 21. The flaps and the density of the thickened mud passing out of the thickener are regulated by the counter-weights 27.

I claim:

1. A device for the purpose described, comprising a closed container, a conduit connected with the container and supplying wash water thereto under pressure, a piston arranged in the container, a settling bed disposed on one side of the container above the piston, a filtering device arranged on the other side, the piston operating to force water through the settling bed in movement of the piston in one direction and through the filtering device in the movement of the piston in the opposite direction, and a by-pass provided between the space above the settling bed and the space below the piston, said by-pass feeding the water from above the settling bed to a position below the piston for delivery to the filtering device, the piston in one position controlling the by-pass delivery to the filtering bed.

2. A preparation plant comprising a closed container connected at its upper end with a conduit supplying wash water under pressure, a piston capable of up and down motion provided at the lower end of the closed container, an inclined settling bed inside the container and dividing it, a by-pass for all water arranged between the space above the settling bed and the space below the piston, said piston in the stroke in one direction serving to deliver the water through the by-pass, the lower opening of said by-pass being covered by the piston when in lowermost position, a funnellike receptacle disposed underneath the piston, said receptacle receiving material from the settling bed through the by-pass, a pure water discharge pipe laterally arranged of the receptacle and a filter for shutting off said pipe.

3. A preparation plant according to claim 2, wherein the funnel-like receptacle terminates in a shaft-like opening, and wherein a feed worm is disposed in the shaft-like opening.

4. A preparation plant comprising a casing forming a closed space, an inclined settling bed in the casing and dividing said space, a mud water supply conduit connected with the upper end of said space, a portion of said supply conduit forming a filtering surface for preliminarily filtering some of the water, a piston in said space, means delivering the water filtered from the supply conduit to the space between the settling bed and piston, means for imparting a reciprocating motion to the piston, a settling space underneath the piston, an outlet for said settling space, said piston serving to direct all liquid from above the filtering surface to the settling space.

5. A preparation plant according to claim 4, wherein a discharge conduit carries off the preliminarily filtered water from the filtering surface in the supply conduit, a reversing valve for connecting the discharge conduit with the space under the settling bed for feeding the preliminarily filtered water to the settling bed from below.

6. A preparation plant, including one funnel-like container having an outlet opening at its lower end, a casing above the container including a closed space, a piston capable of up and down motion in said closed space, a settling bed in said closed space above the piston, a by-pass opening above the settling bed and discharging below the piston, the piston operating to force all liquid through the by-pass from above the settling bed to a position below the piston, and feeding means for mud water, a water discharge conduit, a horizontal filter in said discharge conduit, a feeding worm in the lower portion of said funnel-like container for forcing the settled material through opening, weighted flaps for closing said opening.

7. A preparation plant according to claim 4, in which the inclined surface of the settling bed is of wavelike construction and the waves extend in the direction of inclination of the bed.

8. A preparation plant according to claim 4, in which at the underside of the inclined settling bed superposed discharge openings are provided whose passage can be adjusted by slides.

9. A preparation plant according to claim 2, in which the settling bed over its entire area possesses places differing in their resistance to the flow of the water.

ERICH WIEMER.